(12) United States Patent
Kwon et al.

(10) Patent No.: US 8,341,466 B2
(45) Date of Patent: Dec. 25, 2012

(54) METHOD AND APPARATUS FOR GENERATING ACKNOWLEDGEMENT FRAME

(75) Inventors: Chang-yeul Kwon, Yongin-si (KR); Seong-soo Kim, Seoul (KR); Jae-Min Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 684 days.

(21) Appl. No.: 12/259,463

(22) Filed: Oct. 28, 2008

(65) Prior Publication Data

US 2009/0109884 A1   Apr. 30, 2009

Related U.S. Application Data

(60) Provisional application No. 60/983,659, filed on Oct. 30, 2007, provisional application No. 61/038,455, filed on Mar. 21, 2008.

(30) Foreign Application Priority Data

Jul. 22, 2008   (KR) ........................ 10-2008-0071321

(51) Int. Cl.
*G06F 11/00* (2006.01)
*H04L 1/18* (2006.01)
*H04J 3/16* (2006.01)

(52) U.S. Cl. .......................... 714/48; 714/749; 370/470

(58) Field of Classification Search ............ 375/240.01, 375/240.07, 240.1, 240.13, 240.23, 240.24, 375/240.27, 246, 324, 316; 370/485–487, 370/470–474, 352, 394, 338, 329, 330; 714/748, 714/749, 746, 747, 48, 52

See application file for complete search history.

(56) References Cited

U.S. PATENT DOCUMENTS

| | | | |
|---|---|---|---|
| 5,671,156 A * | 9/1997 | Weerackody et al. .......... 714/52 |
| 7,778,242 B1 * | 8/2010 | Barany et al. ................. 370/356 |
| 7,889,707 B2 * | 2/2011 | Niu et al. ...................... 370/342 |
| 7,944,819 B2 * | 5/2011 | Ho ................................ 370/229 |
| 2002/0178418 A1 * | 11/2002 | Ramprashad et al. ........ 714/755 |
| 2006/0034317 A1 * | 2/2006 | Hong et al. .................... 370/445 |
| 2007/0258651 A1 * | 11/2007 | Shin et al. ..................... 382/232 |
| 2007/0291855 A1 * | 12/2007 | Reznic et al. ............. 375/240.27 |
| 2007/0296616 A1 | 12/2007 | Lim et al. |
| 2009/0103635 A1 * | 4/2009 | Pahalawatta .............. 375/240.27 |

FOREIGN PATENT DOCUMENTS

| | | |
|---|---|---|
| KR | 10-2006-0009616 A | 2/2006 |
| KR | 10-2006-0053671 A | 5/2006 |
| KR | 10-2006-0111318 A | 10/2006 |
| KR | 10-0763207 B1 | 9/2007 |

OTHER PUBLICATIONS

Seongsoo Kim et al.; IEEE P802.15 Working Group for Wireless Personal Area Networks (WPANs); Mar. 18, 2008; Korea.

* cited by examiner

*Primary Examiner* — Hanh Nguyen
(74) *Attorney, Agent, or Firm* — Sughrue Mion, PLLC

(57) ABSTRACT

Provided are a method and an apparatus for generating an acknowledgement (ACK) frame. The method includes: receiving a data frame; first determining whether sub-frames included in the received data frame are coded in an unequal error protection (UEP) mode; and based on the determination of the first determining, generating the ACK frame including a first ACK field indicating reception of each of the sub-frames or second ACK field indicating reception of each first type bit and second type bit in the sub-frames.

25 Claims, 6 Drawing Sheets

METHOD AND APPARATUS FOR GENERATING ACKNOWLEDGEMENT FRAME

CROSS-REFERENCE TO RELATED PATENT APPLICATIONS

This application claims the benefits of U.S. Provisional Patent Application No. 60/983,659, filed on Oct. 30, 2007, U.S. Provisional Patent Application No. 61/038,455, filed on Mar. 21, 2008 and Korean Patent Application No. 10-2008-0071321, filed on Jul. 22, 2008, in the Korean Intellectual Property Office, the disclosure of which is incorporated herein in its entirety by reference.

BACKGROUND

1. Field

The present invention relates to a method and an apparatus for generating an acknowledgement (ACK) frame in a wireless network environment, including a Wireless Personal Area Network (WPAN) and other types of wireless networks.

2. Description of Related Art

WPAN is a short distance area wireless network centered around an individual person's workspace. In the WPAN, devices in a piconet having a range of approximately 10 m communicate with each other using a time division multiple access (TDMA) method and form an ad-hoc network.

In order to provide the communication standard in the personal operating space, the IEEE 802.15 working group (WG) was formed. From among four task groups (TG) included in the IEEE 802.15 WG, the standardization of a High Rate (HR)-WPAN for high-speed data transmission has been completed.

In order to secure stable communication in such wireless network environment, an acknowledgment (ACK) frame is used. For example, when a transmitting device transmits a data frame to a receiving device and the receiving device receives the transmitted data frame, the receiving device transmits the ACK frame to the transmitting device.

In addition, when the data frame transmitted by the transmitting device is formed of a plurality of sub-frames, the receiving device transmits a block ACK frame with respect to each sub-frame to the transmitting device.

SUMMARY

According to an aspect of the present invention, there is provided a method of generating an acknowledgement (ACK) frame, the method including: receiving a data frame; first determining whether sub-frames included in the received data frame are coded in an unequal error protection (UEP) mode; and based on the determination of the first determining, generating the ACK frame including a first ACK field indicating reception of each of the sub-frames or a second ACK field indicating reception of each first type bit and second type bit in the sub-frames.

The method may further include: second determining whether a data insertion ACK request field for requesting the ACK frame including sub-frames or at least one MAC service data unit (MSDU) is included in the data frame, wherein in generating the ACK frame, the ACK frame further including the sub-frames or the at least one MSDU is selectively generated based on the determination of the second determining.

In generating the ACK frame, the ACK frame including a MAC header, a sub-header including the first ACK field, or the second ACK field, and a frame check sequence (FCS) field for detecting an error in the MAC header and the sub-header may be generated.

When it is determined that the sub-frames included in the data frame are not coded in the UEP mode, based on the determination of the first determining, information about reception of each sub-frame may be recorded to the first ACK field twice.

When it is determined that the data insertion ACK request field is included in the data frame based on the determination of the second determining, the ACK frame including the sub-frames or the at least one MSDU, a MAC sub-header, and the MAC header may be generated, the MAC sub-header including an UEP field indicating information relating to the UEP mode applied to the sub-frames or to the at least one MSDU, the first ACK field, or the second ACK field.

The UEP field may include an UEP enable field indicating whether the sub-frames or the at least one MSDU is coded in the UEP mode and an UEP modulation and coding scheme (MCS) field indicating a MCS applied to the sub-frames or to the at least one MSDU coded in the UEP mode.

The ACK frame may further include a physical (PHY) header including a modulation and coding scheme (MCS) field indicating a MCS applied to the sub-frames or to the at least one MSDU that are not coded in the UEP mode.

The data frame may include the sub-header including the sub-frames and information about the sub-frames, and the first determining is performed based on the sub-header.

The first type bits may be the most significant bits (MSB) in the sub-frames and the second type bits may be the least significant bits (LSB) in the sub-frames.

According to another aspect of the present invention, there is provided an apparatus for generating an acknowledgement (ACK) frame, the apparatus including: a receiver receiving a data frame; a first determination unit determining whether sub-frames included in the received data frame are coded in an unequal error protection (UEP) mode; and a frame generator generating the ACK frame including a first ACK field indicating reception of each of the sub-frames or a second ACK field indicating reception of each first type bit and second type bit in the sub-frames, based on the determination of the first determination unit.

The apparatus may further include a second determination unit determining whether a data insertion ACK request field for requesting the ACK frame including sub-frames or at least one MAC service data unit (MSDU) is included in the data frame, wherein the frame generator selectively generates the ACK frame, the ACK frame further including the sub-frames or the at least one MSDU, based on the determination of the second determination unit.

According to another aspect of the present invention, there is provided a computer readable recording medium having recorded thereon a computer program for executing the method of generating an acknowledgement (ACK) frame, the method including: receiving a data frame; first determining whether sub-frames included in the received data frame are coded in an unequal error protection (UEP) mode; and based on the determination of the first determining, generating the ACK frame including a first ACK field indicating reception of each of the sub-frames or a second ACK field indicating reception of each first type bit and second type bit in the sub-frames.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Hereinafter, the present invention will be described more fully with reference to the accompanying drawings, in which exemplary embodiments of the invention are shown.

Figure 1:
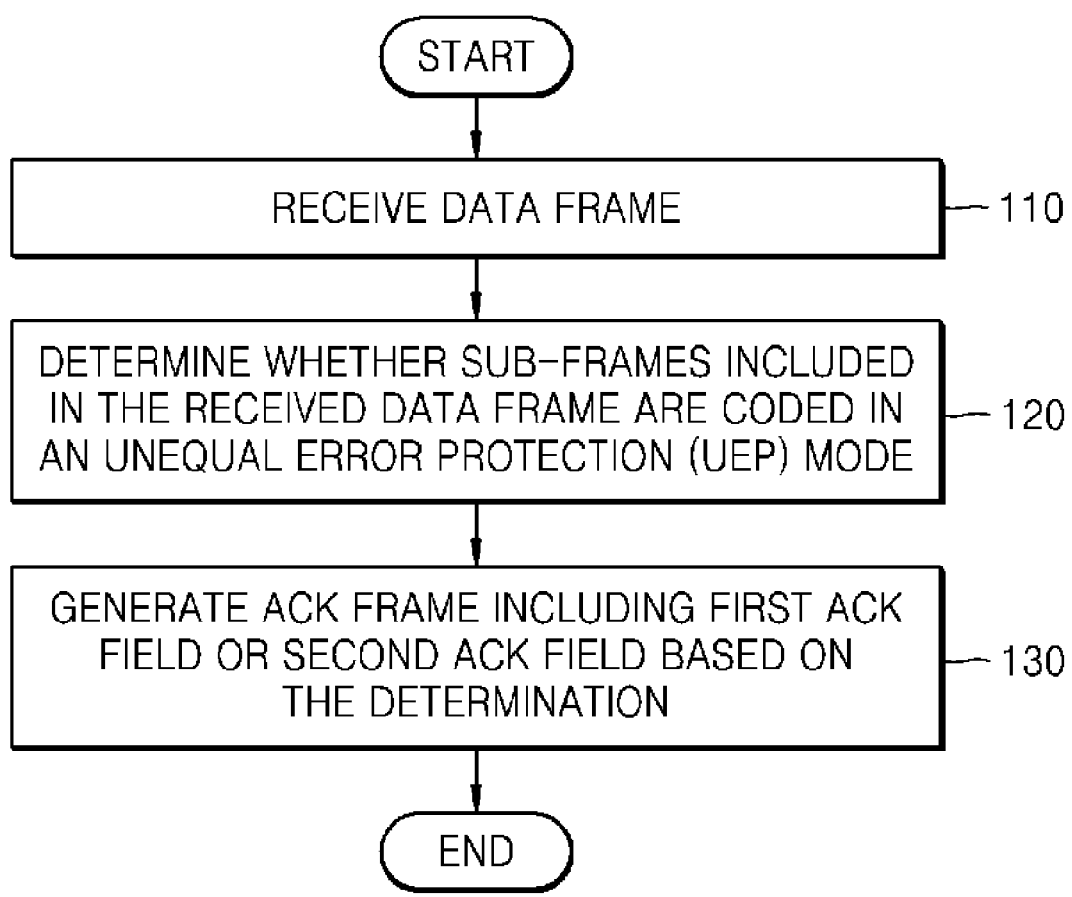
FIG. 1 is a flowchart illustrating a method of generating an acknowledgement (ACK) frame, according to an embodiment of the present invention.

FIG. 1 is a flowchart illustrating a method of generating an acknowledgement (ACK) frame, according to an embodiment of the present invention.

In operation 110, a data frame can be received.

Whether sub-frames included in the received data frame may be coded in an unequal error protection (UEP) mode. Here, a sub-header indicating information about the sub-frames may be further included in the received data frame. Thus, whether the sub-frames included in the data frame are coded in an UEP mode can be determined based on the sub-header in operation 120.

In operation 130, the ACK frame including a first ACK field or a second ACK field can be generated based on the determination in the operation 120. The first ACK field may indicate reception of each of the sub-frames and the second ACK fields may indicate reception of each first type bit and second type bit in the sub-frames.

More specifically, if it is determined that the sub-frames of the data frame are coded by an EEP mode, instead of an UEP mode, the ACK frame can be generated to include the first ACK field and bits forming the first ACK field may be used to indicate reception of each sub-frame. For example, when the first ACK field is formed of 256 bits, the reception for each of the 256 sub-frames may be indicated.

However, when it is determined that the sub-frames of the data frame is coded by an UEP mode, the data frame may be formed of the first type bits and the second type bits and the ACK frame may be generated to include the second ACK field for indicating the reception of the two types of bits.

For example, the second ACK field may use 512 bits for indicating reception of each of the first type bits and the second type bits in 256 sub-frames. Here, 256 bits may be used as the second ACK field for the first type bits and the rest 256 bits may be used as the second ACK field for the second type bits.

Here, according to another embodiment, the first type bits may be the most significant bits (MSB) in the sub-frames and the second type bits may be the least significant bits (LSB) in the sub-frames. However, the present invention is not limited thereto, and thus, for example, in case of RGB data, the upper four bits of 1 byte have more important information than the lower four bits of 1 byte. As such, the upper four bits that have more important information than the lower four bits are the MSB and the lower four bits are the LSB. However, which upper bits in 1 byte become the MSB may differ according to a data type and embodiment and the rest of the bits, except for the MSB, become the LSB in 1 byte.

Configuration and generation of the data frame according to an exemplary embodiment of the present invention can be implemented in a variety of manners, including the other wireless or wired communications environment, without departing from the scope of the present invention.

Figure 2:
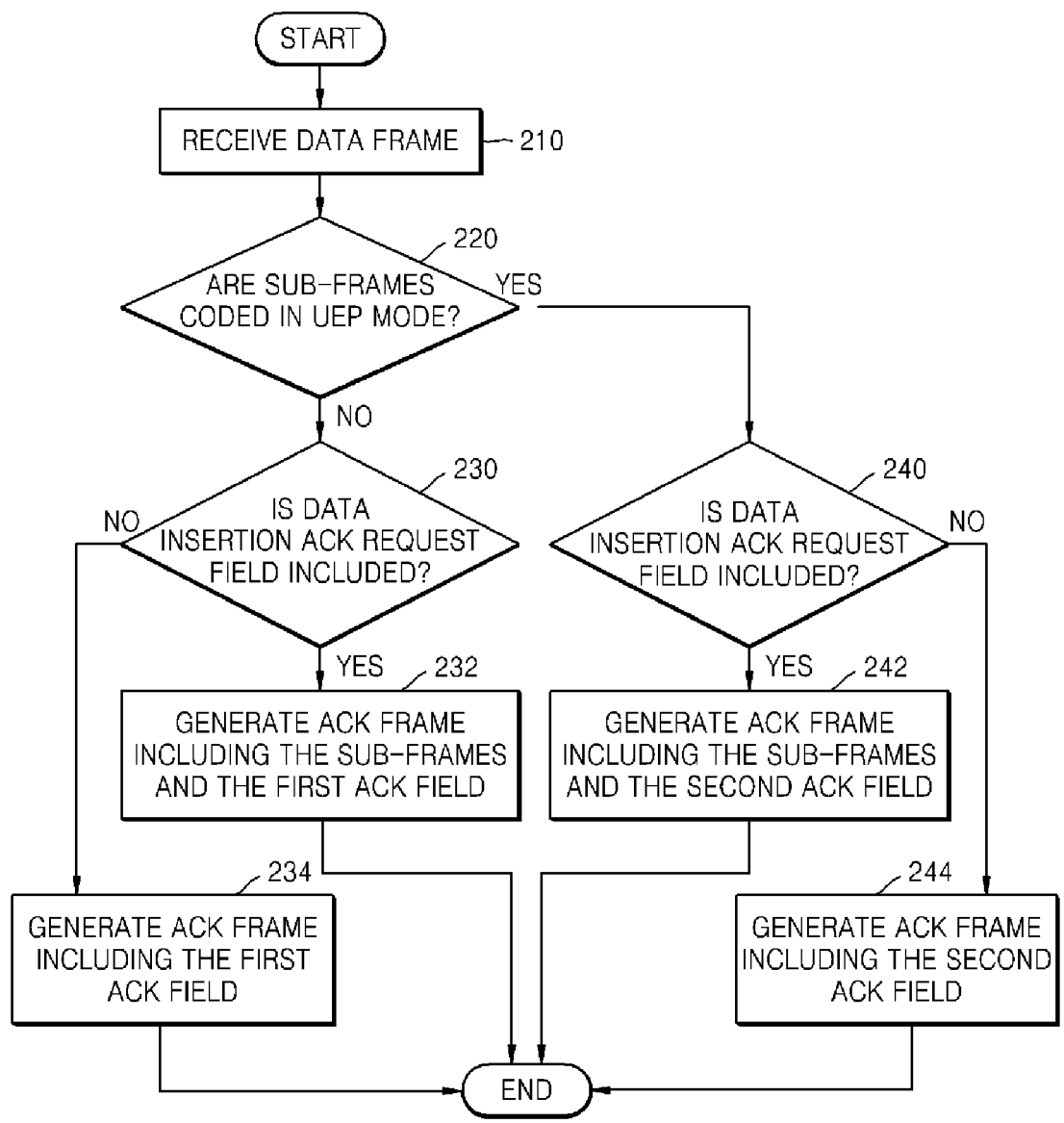
FIG. 2 is a flowchart illustrating a method of generating an ACK frame, according to another embodiment of the present invention.

FIG. 2 is a flowchart illustrating a method of generating an ACK frame, according to another embodiment of the present invention.

In operation 210, a data frame can be received.

In operation 220, it can be determined whether sub-frames included in the received data frame are coded in an UEP mode.

In operation 230, based on the result of the determination in operation 220, when it is determined that the sub-frames of the data frame are not coded in an UEP mode, it can be determined whether a data insertion ACK request field for requesting the ACK frame including sub-frames or at least one MAC service data unit (MSDU) is included in the data frame.

Here, the data insertion ACK request field may be included in a MAC header of the received data frame and the MAC header may further include a block ACK request field for requesting the ACK frame in a block ACK form.

In operation 232, when it is determined in operation 230 that the data insertion ACK request field is included in the data frame, the ACK frame including the sub-frames and the first ACK field can be generated.

Here, instead of the sub-frames, at least one MSDU may be included in the ACK frame.

In operation 234, when it is determined in operation 230 that the data insertion ACK request field is not included in the data frame, the ACK frame only including the first ACK field can be generated.

In operation 240, based on the result of the determination in operation 220, when it is determined that the sub-frames of the data frame are coded in an UEP mode, whether the data insertion ACK request field is included in the data frame can be determined.

In operation 242, when it is determined in operation 240 that the data insertion ACK request field is included in the data frame, the ACK frame including the sub-frames and the second ACK field may be generated. Here, instead of the sub-frames, at least one MSDU may be included in the ACK frame.

In operation 244, when it is determined in operation 240 that the data insertion ACK request field is not included in the data frame, the ACK frame only including the second ACK field can be generated.

Figure 3:
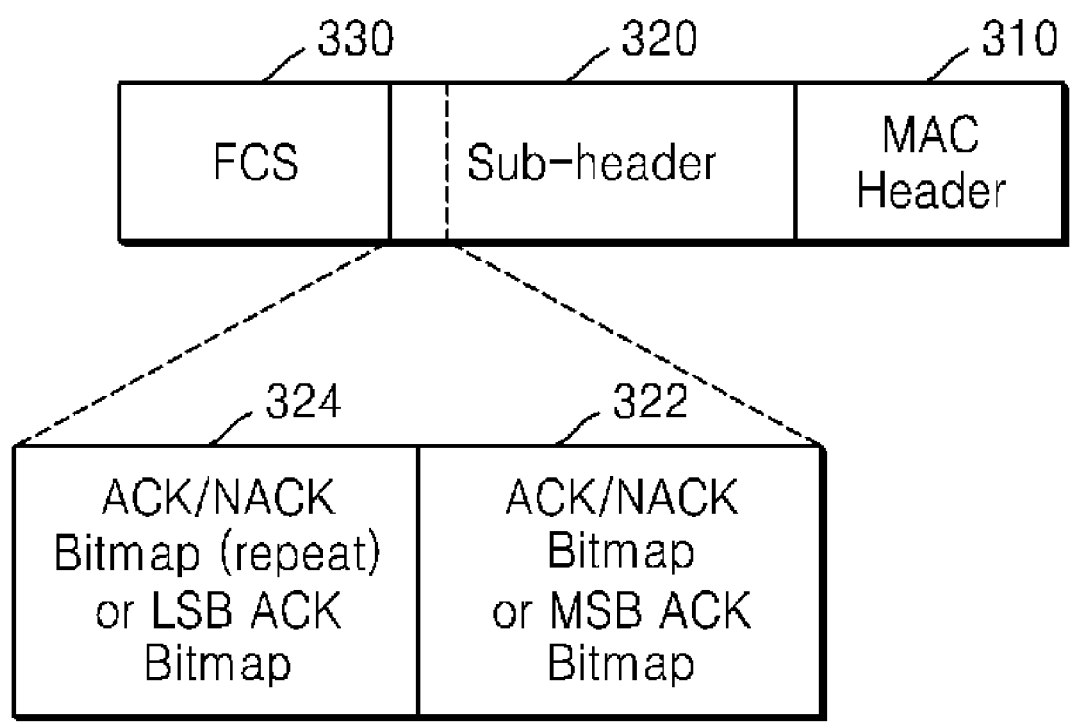
FIG. 3 is a diagram illustrating a configuration of an ACK frame according to an embodiment of the present invention.

FIG. 3 is a diagram illustrating a configuration of the ACK frame according to an embodiment of the present invention.

Referring to FIG. 3, the ACK frame, according to an exemplary embodiment, can include fields of a MAC header 310 that is used in a MAC layer, a sub-header 320, and a frame check sequence (FCS) 330.

The sub-header 320 may include first ACK fields 322 and 324 represented by ACK/NACK bitmap or include second ACK fields 322 and 324 represented by MSB ACK bitmap and LSB ACK bitmap. More specifically, when the sub-frames included in the received data frame are coded in an EEP mode, the sub-header 320 can include the first ACK fields 322 and 324. Accordingly, the ACK/NACK bitmap indicating reception of each of the sub-frames is recorded to the first ACK field 322 and the ACK/NACK bitmap recorded to the first ACK field 322 is recorded once more to the first ACK field 324.

However, when the sub-frames included in the received data frame are coded in an UEP mode, the sub-header 320 can have the second ACK fields 322 and 324. Accordingly, the MSB ACK bitmap indicating reception of the MSB in each of the sub-frames can be recorded to the second ACK field 322 and the LSB ACK bitmap indicating reception of the LSB in each of the sub-frames can be recorded to the second ACK field 324.

As such, when the ACK frame according to the exemplary embodiment is used, the device, which receives the data frame, may independently indicate the reception of the MSB and LSB in the sub-frames of the received data frame.

Meanwhile, according to other exemplary embodiments, information about reception of one sub-frame may be recorded twice, as illustrated in FIG. 3, because the same bits are to be used when indicating reception of the sub-frames coded in an EEP mode, while 2 bits are used to indicate reception of one sub-frame when the sub-frames are coded in an UEP mode.

However, the ACK frame according to the present invention is not limited thereto and thus information about reception of one sub-frame may be recorded to the first ACK field 322 only once.

Also, the FCS 330 is a field for detecting an error in the MAC header 310 and the sub-header 320

Figure 4:
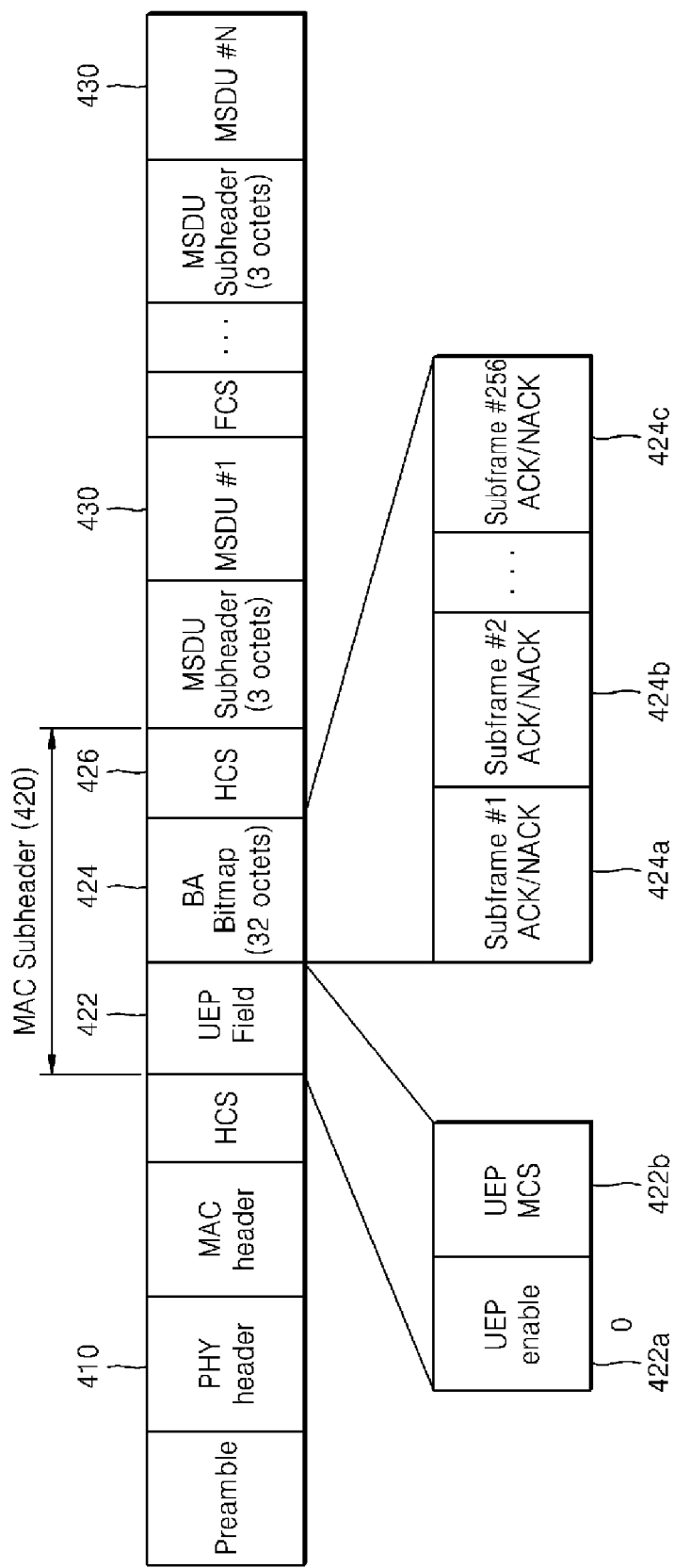
FIG. 4 is a diagram illustrating a configuration of an ACK frame according to another embodiment of the present invention.

FIG. 4 is a diagram illustrating a configuration of an ACK frame according to another embodiment of the present invention.

The ACK frame may include a Preamble, PHY header 410, MAC header, HCS, MAC Subheader 420, MSDU SUbheader, MSDU, and FCS.

Referring to FIG. 4, the ACK frame may include MSDUs. However, the ACK frame may include sub-frames, instead of MSDUs.

The physical (PHY) header 410 may include a modulation and coding scheme (MCS) field (not shown) indicating a MCS which is applied to a MSDU 430, when the MSDU 430 is not coded in an UEP mode.

The MAC sub-header 420 can include an UEP field 422, a block ACK field 424, and a header check sequence (HCS) field 426.

The UEP field 422 may include information relating to the UEP mode applied to the MSDU 430 and include an UEP enable field 422a and an UEP MCS field 422b, where the UEP enable field 422a indicates whether the MSDU 430 is coded in the UEP mode. In accordance with an exemplary embodiment of the present invention as depicted in FIG. 4, the UEP enable field 422a can be represented as 0 to indicate that the MSDU 430 is not coded in the UEP mode.

The UEP MCS field 422b can indicate the MCS applied to the MSDU 430 which is coded in the UEP mode. However, in accordance with the exemplary embodiment, the MSDU 430 is not coded in the UEP mode and thus the UEP MCS field 422b may not be used.

The block ACK field 424 may indicate reception of each of the sub-frames of the received data frame and not be related to the MSDU 430 included in the ACK frame.

The block ACK field 424 can comprise first ACK fields 424a, 424b, and 424c which indicate reception of each of the sub-frames. When the sub-frames of the received data frame are coded in the EEP mode, the block ACK field 424 can include the first ACK fields 424a, 424b, and 424c. In addition, the block ACK field 424 can be formed of 32 bytes and thus can have 256 bits so that the block ACK field 424 may indicate reception of 256 sub-frames. However, a capacity of the block ACK field 424 may not be limited to 32 bytes.

The HCS field 426 is a field to which a HCS, a CRC code for detecting an error in the UEP field 422 and the block ACK field 424, is recorded.

The MSDU 430 may include arbitrary data. However, data corresponding to the sub-frames included in the received data frame may be included in the MSDU 430. For example, when the received data frame is data related to a video conference, the MSDU 430 may include data related to the video conference. In addition, when the received data frame is related to a moving image, the MSDU 430 may include a control signal for turning on a power of a device that transmits the moving image or for controlling the volume of the device. Configuration and application of data frame according to an exemplary embodiment of the present invention can be implemented in a variety of manners, including other types of audio/video device, without departing from the scope of the present invention.

As such, when the ACK frame, according to the exemplary embodiment of the present invention, is used, the device that receives the data frame may simultaneously transmit predetermined data and the block ACK using one ACK frame instead of separately transmitting the predetermined data and the ACK frame.

The other fields in the ACK frame illustrated in FIG. 4 are described in the IEEE 802.15.3C standard document and thus a detailed description thereof is omitted.

Figure 5:
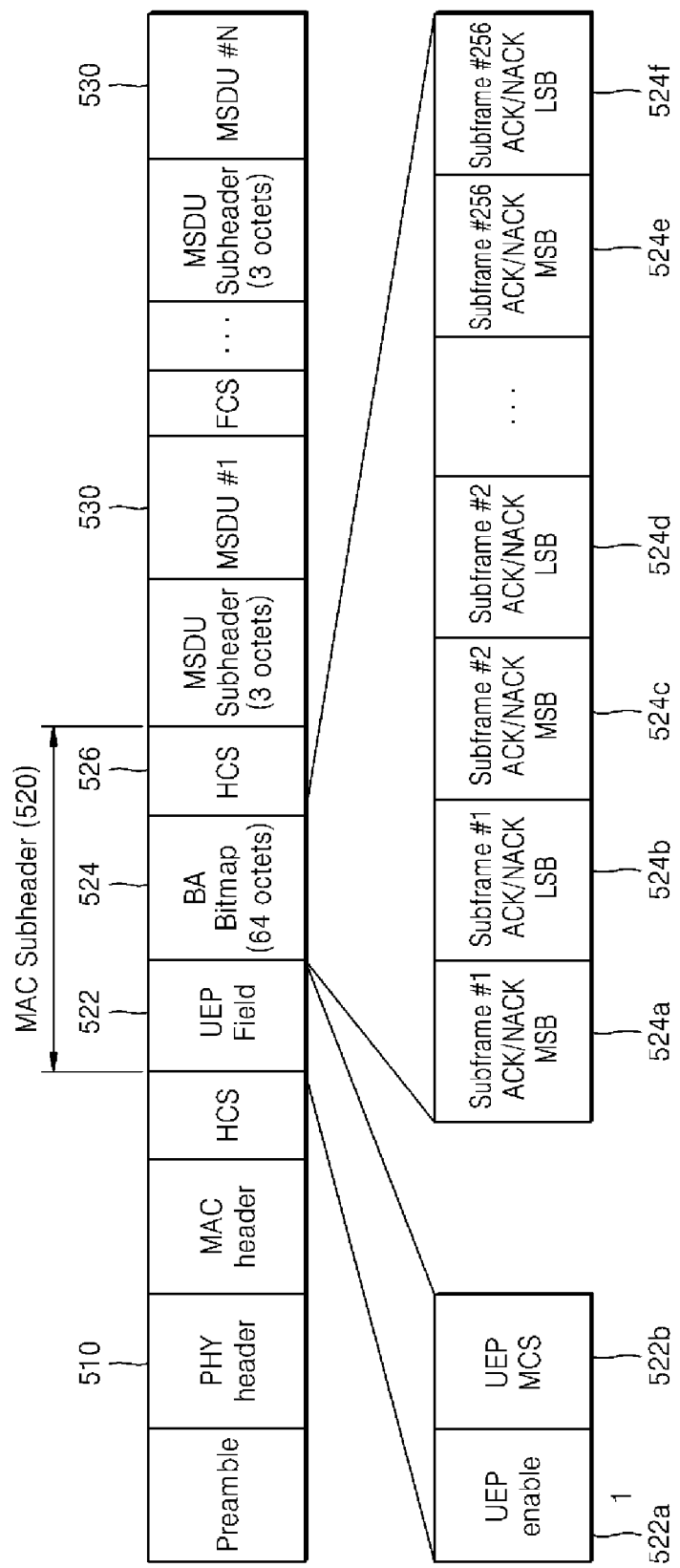
FIG. 5 is a diagram illustrating a configuration of an ACK frame according to another embodiment of the present invention.

FIG. 5 is a diagram illustrating a configuration of an ACK frame according to another embodiment of the present invention.

Referring to FIG. 5, an UEP enable field 522a can be represented as 1 to indicate that MSDUs 530 are coded in the UEP mode.

As illustrated in FIG. 4, an MCS applied to the MSDU 530, which is coded in the UEP mode, is recorded to an UEP MCS field 522b.

A block ACK field 524 in FIG. 5 may include second ACK fields 524a, 524b, and 524c for the MSB and second ACK fields 524d, 524e, and 524f for the LSB. When the sub-frames of the received data frame are coded in the UEP mode, the block ACK field 524 can comprise the second ACK fields 524a, 524b, 524c, 524d, 524e, and 524f.

In addition, the block ACK field 524 can be formed of 64 bytes. Also, the second ACK fields 524a, 524b, and 524c for the MSB have a capacity of 32 bytes and the second ACK fields 524d, 524e, and 524f for the LSB have a capacity of 32 bytes. However, a capacity of the block ACK field 524 is not limited to 64 bytes.

Except for such differences, the description of the remaining fields illustrated in FIG. 5 is the same with those of FIG. 4 and thus a description of the remaining fields is omitted.

Figure 6:
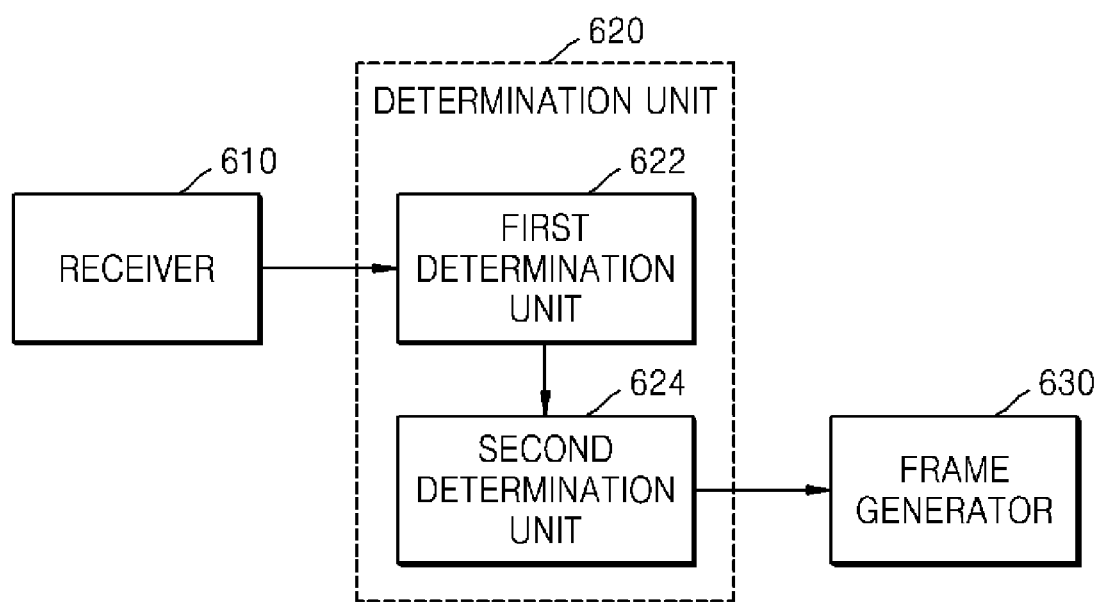
FIG. 6 is a block diagram of an apparatus for generating an ACK frame, according to an embodiment of the present invention.

FIG. 6 is a block diagram of an apparatus for generating an ACK frame, according to an embodiment of the present invention.

Referring to FIG. 6, the apparatus for generating an ACK frame, according to an exemplary embodiment, may comprise a receiver 610, a determination unit 620, and a frame generator 630.

The receiver 610 may receive a data frame. The determination unit 620 can include a first determination unit 622 and a second determination unit 624.

The first determination unit 622 can determine whether the sub-frames included in the received data frame are coded in the UEP mode.

The second determination unit 624 can determine whether the data insertion ACK request field requesting the ACK frame including sub-frames or at least one MSDU is included in the received data frame.

According to another embodiment, the determination unit 620 may be formed of the first determination unit 622 only.

The frame generator 630 may generate the ACK frame including the first ACK field or the second ACK field based on the determination of the determination unit 620. The first ACK field may indicate the reception of each of the sub-frames, and the second ACK field can show the reception of each first type bit and second type bit in the sub-frames.

Meanwhile, the apparatus for generating the ACK frame may inform the kinds of ACK frames that the apparatus can generate to another apparatus. Here, a capability information frame including information about a capability for generating the ACK frame supported by the apparatus for generating the ACK frame may be used.

Configuration of the apparatus for generating the ACK frame according to an exemplary embodiment of the present invention can be implemented in a variety of manners and comprise other units without departing from the scope of the present invention. For example, the apparatus for generating the ACK frame according to an exemplary embodiment of the present invention can comprise a bus coupling each unit of the apparatus, at least one processor couple to the bus, a memory coupled to the bus to store instructions and to the at least one processor to execute instructions of generating the ACK frame as described earlier.

Figure 7:
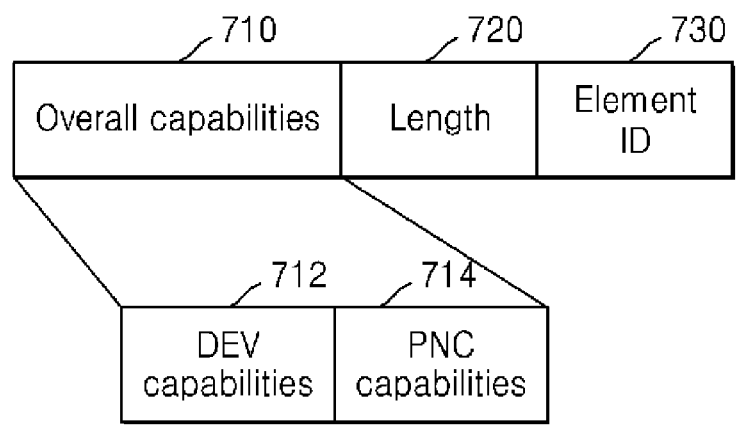
FIG. 7 is a diagram that illustrates a capability information frame according to an embodiment of the present invention.

FIG. 7 is a diagram that illustrates the capability information frame according to an embodiment of the present invention.

Referring to FIG. 7, the capability information frame according to the current embodiment may comprise an overall capability field 710, a length field 720, and a capability information ID 730.

The overall capability field 710 can comprise a device capability field 712 and a Piconet Coordinator (PNC) capability field 714.

The device (DEV) capability field 712 may show a capability supported by the apparatus for generating the ACK frame and further include information about whether the ACK frame in which data is inserted can be generated, whether the block ACK is generated, whether aggregation can be performed, and whether a two-way communication is supported.

Here, information about aggregation may include information about which aggregation from among MSDU aggregation, MAC Protocol Data Unit MPDU aggregation, and PHY Protocol Data unit PPDU aggregation can be performed.

The PNC capability field 714 can indicate whether to support capability as a piconet coordinator.

The length field 720 may indicate a length of the capability information frame.

The capability information ID or Element ID field 730 can indicate an ID for identifying the capability information frame.

As such, the apparatus for generating the ACK frame can transmit the capability information frame to another apparatus so that a capability information, which can be supported by the apparatus for generating the ACK frame, may be transmitted to the other apparatus.

The embodiments of the present invention can be written as computer programs and can be implemented in general-use digital computers that execute the programs using a computer readable recording medium. Examples of the computer readable recording medium may include magnetic storage media (e.g., ROM, floppy disks, hard disks, etc.), optical recording media (e.g., CD-ROMs, or DVDs), and storage media. Carrier waves (e.g., transmission through the Internet) containing at least one of the embodiments of the present invention may be temporarily or permanently stored in the computer readable recording medium. Configuration or implementation of computer based instructions according to an embodiment of the present invention can be implemented in a variety of manners without departing from the scope of the present invention.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. WPAN in accordance with an exemplary aspect of the present invention may be applicable to various applications as a wire or cable replacement technology for home entertainment systems capable of transmitting and receiving high definition video and audio files. It will be understood by one of ordinary skill in the art that various changes in form and details may be made therein without departing from the spirit and scope of the present invention as defined by the following claims.

What is claimed is:

1. A method of generating an acknowledgement (ACK) frame, the method comprising:
   receiving a data frame;
   first determining whether sub-frames included in the received data frame are coded in an unequal error protection (UEP) mode; and
   based on the first determination, generating the ACK frame selectively including a first ACK field indicating reception of each of the sub-frames if the sub-frames are not coded in the UEP mode, and a second ACK field respectively indicating each reception of first type bits and second type bits in the sub-frames if the sub-frames are coded in the UEP mode.

2. The method of claim 1, further comprising:
   second determining whether a data insertion ACK request field for requesting the ACK frame including sub-frames or at least one MAC service data unit (MSDU) is included in the data frame,
   wherein in generating the ACK frame, the ACK frame further including the sub-frames or the at least one MSDU is selectively generated based on the determination of the second determining.

3. The method of claim 2, wherein if the data insertion ACK request field is included in the data frame based on the second determining, the ACK frame including the sub-frames or the at least one MSDU, a MAC sub-header, and the MAC header is generated, and wherein the MAC sub-header comprises an UEP field indicating information relating to the UEP mode applied to the sub-frames or to the at least one MSDU and one of the first ACK field and the second ACK field.

4. The method of claim 3, wherein the UEP field comprises an UEP enable field indicating whether the sub-frames or the at least one MSDU is coded in the UEP mode and an UEP modulation and coding scheme (MCS) field indicating a MCS applied to the sub-frames or to the at least one MSDU coded in the UEP mode.

5. The method of claim 3, wherein the ACK frame further comprises a physical (PHY) header including a modulation and coding scheme (MCS) field indicating a MCS applied to the sub-frames or to the at least one MSDU non-coded in the UEP mode.

6. The method of claim 1, wherein the ACK frame comprises a MAC header, a sub-header including the first ACK field, or the second ACK field, and a frame check sequence (FCS) field for detecting an error in the MAC header and the sub-header.

7. The method of claim 1, wherein if the sub-frames included in the data frame are not coded in the UEP mode, based on the determination of the first determining, information about reception of each sub-frame is recorded to the first ACK field twice.

8. The method of claim 1, wherein the data frame comprises a sub-header including the sub-frames and information about the sub-frames, and wherein the first determining is performed based on the sub-header.

9. The method of claim 1, wherein the first type bits are the most significant bits (MSB) in the sub-frames and the second type bits are the least significant bits (LSB) in the sub-frames.

10. A non-transitory computer readable recording medium having recorded thereon a computer program for executing the method of claim 1.

11. An apparatus for generating an acknowledgement (ACK) frame, the apparatus comprising:
a receiver receiving a data frame;
a first determination unit determining whether sub-frames included in the received data frame are coded in an unequal error protection (UEP) mode; and
a frame generator generating the ACK frame selectively including a first ACK field indicating reception of each of the sub-frames if the sub-frames are not coded in the UEP mode and a second ACK field respectively indicating each reception of first type bits and second type bits in the sub-frames if the sub-frames are coded in the UEP mode, based on the determination of the first determination unit.

12. The apparatus of claim 11, further comprising:
a second determination unit determining whether a data insertion ACK request field for requesting the ACK frame including sub-frames or at least one MAC service data unit (MSDU) is included in the data frame,
wherein the frame generator selectively generates the ACK frame, the ACK frame further including the sub-frames or the at least one MSDU, based on the determination of the second determination unit.

13. The apparatus of claim 12, wherein if the data insertion ACK request field is included in the data frame based on the determination of the second determination unit, the ACK frame including the sub-frames or the at least one MSDU, a MAC sub-header, and the MAC header is generated, the MAC sub-header including an UEP field indicating information relating to the UEP mode applied to the sub-frames or to the at least one MSDU, the first ACK field, or the second ACK field.

14. The apparatus of claim 13, wherein the UEP field comprises an UEP enable field indicating whether the sub-frames or the at least one MSDU is coded in the UEP mode and an UEP modulation and coding scheme (MCS) field indicating a MCS applied to the sub-frames coded or to the at least one MSDU in the UEP mode.

15. The apparatus of claim 13, wherein the ACK frame further comprises a physical (PHY) header including a modulation and coding scheme (MCS) field indicating a MCS applied to the sub-frames or to the at least one MSDU non-coded in the UEP mode.

16. The apparatus of claim 11, wherein the frame generator generates the ACK frame, the ACK frame including a MAC header, a sub-header including the first ACK field or the second ACK field, and a frame check sequence (FCS) field for detecting an error in the MAC header and the sub-header.

17. The apparatus of claim 11, wherein if the sub-frames included in the data frame are not coded in the UEP mode, based on the determination of the first determination unit, information about reception of each sub-frame is recorded to the first ACK field twice.

18. The apparatus of claim 11, wherein the data frame comprises a sub-header including the sub-frames and information about the sub-frames, and wherein the first determination unit performs determination based on the sub-header.

19. The apparatus of claim 11, wherein the first type bits are the most significant bits (MSB) in the sub-frames and the second type bits are the least significant bits (LSB) in the sub-frames.

20. A non-transitory computer readable medium comprising computer executable instructions, when executed, for directing a computing device to perform a method comprising:
receiving a data frame;
performing a first determining step to determine whether sub-frames included in the received data frame are coded in an unequal error protection (UEP) mode;
performing a second determining step to determine whether a data insertion ACK request field for requesting the ACK frame including sub-frames or at least one MAC service data unit (MSDU) is included in the data frame; and
based on the first determination step, generating the ACK frame selectively including a first ACK field indicating reception of each of the sub-frames if the sub-frames are not coded in the UEP mode and a second ACK field respectively indicating each reception of first type bits and second type bits in the sub-frames if the sub-frames are coded in the UEP mode,
wherein if the data insertion ACK request field is included in the data frame based on the second determining, the ACK frame including the sub-frames or the at least one MSDU, a MAC sub-header, and the MAC header is generated.

21. A Wireless device comprising:
a bus coupling each unit of the device;
at least one processor coupled to the bus; and
at least one memory coupled to the bus to store instructions and to the at least one processor to execute and perform a method comprising:
receiving a data frame;
determining whether sub-frames included in the received data frame are coded in an unequal error protection (UEP) mode; and
based on the determination, generating the ACK frame including a first ACK field indicating reception of each of the sub-frames if the sub-frames are not coded in the UEP mode and a second ACK field respectively indicating each reception of first type bits and second type bits in the sub-frames if the sub-frames are coded in the UEP mode.

22. A method of generating an acknowledgement (ACK) frame, the method comprising:
receiving a data frame;
first determining whether sub-frames included in the received data frame are coded in an unequal error protection (UEP) mode; and based on the first determination, generating the ACK frame including a first ACK field indicating reception of each of the sub-frames or a second ACK field respectively indicating each reception of first type bits and second type bits in the sub-frames, wherein if the sub-frames included in the data frame are not coded in the UEP mode, based on the determination of the first determining, information about reception of each sub-frame is recorded to the first ACK field twice.

23. A method of generating an acknowledgement (ACK) frame, the method comprising: receiving a data frame;

first determining whether sub-frames included in the received data frame are coded in an unequal error protection (UEP) mode; and based on the first determination, generating the ACK frame including a first ACK field indicating reception of each of the sub-frames if the sub-frames are not coded in the UEP mode and a second ACK field respectively indicating each reception of first type bits and second type bits in the sub-frames if the sub-frames are coded in the UEP mode, wherein the first type bits are the most significant bits (MSB) in the sub-frames and the second type bits are the least significant bits (LSB) in the sub-frames.

24. An apparatus for generating an acknowledgement (ACK) frame, the apparatus comprising:

a receiver receiving a data frame;

a first determination unit determining whether sub-frames included in the received data frame are coded in an unequal error protection (UEP) mode; and a frame generator generating the ACK frame including a first ACK field indicating reception of each of the sub-frames or a second ACK field respectively indicating each reception of first type bits and second type bits in the sub-frames, based on the determination of the first determination unit, wherein if the sub-frames included in the data frame are not coded in the UEP mode, based on the determination of the first determination unit, information about reception of each sub-frame is recorded to the first ACK field twice.

25. An apparatus for generating an acknowledgement (ACK) frame, the apparatus comprising:

a receiver receiving a data frame;

a first determination unit determining whether sub-frames included in the received data frame are coded in an unequal error protection (UEP) mode; and a frame generator generating the ACK frame including a first ACK field indicating reception of each of the sub-frames if the sub-frames are not coded in the UEP mode and a second ACK field respectively indicating each reception of first type bits and second type bits in the sub-frames if the sub-frames are coded in the UEP mode, based on the determination of the first determination unit, wherein the first type bits are the most significant bits (MSB) in the sub-frames and the second type bits are the least significant bits (LSB) in the sub-frames.

* * * * *